Patented Sept. 6, 1927.

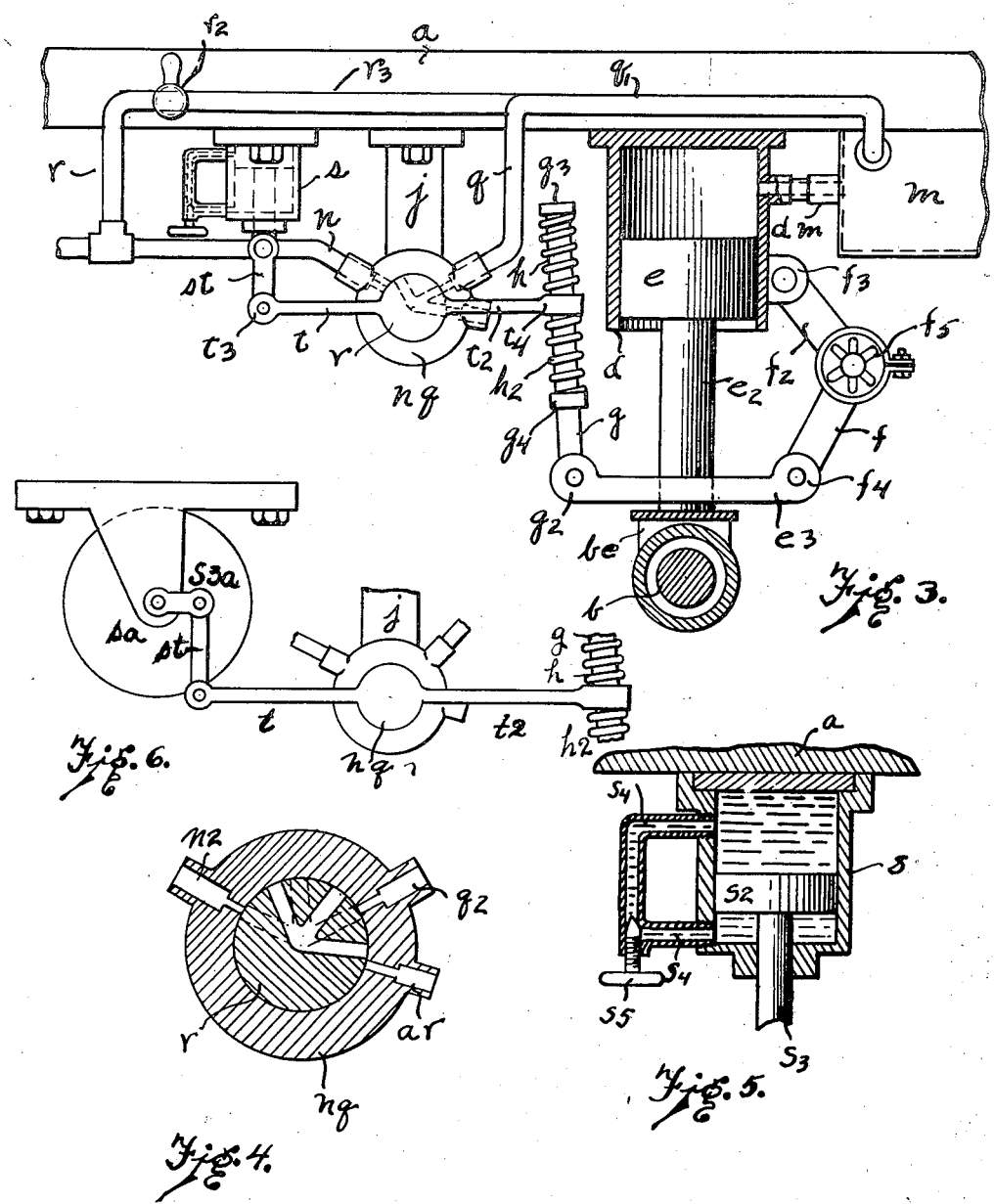

1,641,640

UNITED STATES PATENT OFFICE.

JOSEPH W. MYERS, OF JACKSON, MICHIGAN.

SUSPENSION FOR VEHICLES.

Application filed August 6, 1925. Serial No. 48,443.

My invention relates to suspension for vehicles and an object of my improvements is to provide means for adjusting the initial tension of the resilient suspending means to the load and to provide an automatic means for adjusting said tension.

In my pending application, Serial No. 593,046, I have provided separate means for positioning and for resiliently supporting the load. In the present application, I provide a resilient support consisting of two components, and by automatically varying the tension of one of the components with the load, I provide that the resultant tension of both components may be made to vary at a much smaller rate with the distance between the load and axle than is present practice.

In the accompanying drawings:

Figure 3, is a view similar to Figure 2 showing the parts in a third position.

Figure 4, is a section to an enlarged scale of the three-way cock.

Figure 5, is a detail section showing the dash-pot arrangement.

Figure 6, is a modification of the inertia apparatus.

$a$, indicates a part of the chassis of an automobile, $b$, is an axle and $c$, is a light spring of ordinary construction which may be used with the other resilient supporting means hereinafter described.

$d$, is a cylinder secured to the under part of the frame $a$ and opening downward. $e$, is a piston adapted to reciprocate in the cylinder $d$. $e^2$, is the piston rod and $e^3$ is a yoke on the lower end of the piston rod $e^2$. The piston rod $e^2$ and yoke $e^3$ rest upon the axle $b$ but are not secured thereto. $f$, $f^2$ are toggle levers pivoted together at $f^5$. The lower arm or lever is pivoted at $f^4$ to the yoke $e^3$ and the upper lever at $f^3$ to the cylinder $d$. By this arrangement the outward travel of the piston $d$ is limited. A friction brake may be placed at the joint $f^5$ if desired.

$g$, is a rod pivoted at its lower end at $g^2$ to the yoke $e^3$ and extending upward and provided at its upper end with a collar or annular shoulder $g^3$ and towards its lower end with a similar collar or shoulder $g^4$.

$h$, is a coil spring surrounding the rod $g$ and engaging against the shoulder $g^3$ at its upper end and $h^2$ is a coil spring surrounding said rod and engaging at its lower end against the annular shoulder or collar $g^4$.

$j$, is a hanger or support secured at its upper end to the under side of the frame $a$ extending downward therefrom. $k$, is a reservoir of highly compressed air. $m$, is an enclosed reservoir communicating by a free and open passage $dm$ with the cylinder $d$. $n$, is a pipe leading from the reservoir $k$. $q$, is a pipe communicating with the reservoir $m$. $nq$, is a three-way valve that may form a communicating means between the pipes $n$ and $q$ or may put the pipe $q$ into communication with the outer air.

$s$, is a cylinder closed at both ends and secured to the under part of the frame $a$. $s^3$, is a piston rod extending through the lower end of the piston $s^2$. $s^4$, is a by-pass communicating with the cylinder $s$ upon both sides of the piston $s^2$. $s^5$, is a needle valve adapted to regulate the area of the opening through the passage $s^4$. The cylinder $s$ and passage $s^4$ may be filled with a suitable oil, thus said piston and cylinder act as a dash-pot.

$v$, is the plug or rotary part of the three-way cock $nq$. $t$, is an arm extending from the plug $v$ in one direction and pivoted at its outer end to the lower end of the link $st$, which link is pivoted at its upper end to the piston rod $s^3$. $t^2$, is a second arm extending from the plug $v$ in the opposite direction from the arm $t$ and having a ring at its outer end surrounding the rod $g$ and interposed between the springs $h$ and $h^2$.

Figure 1:
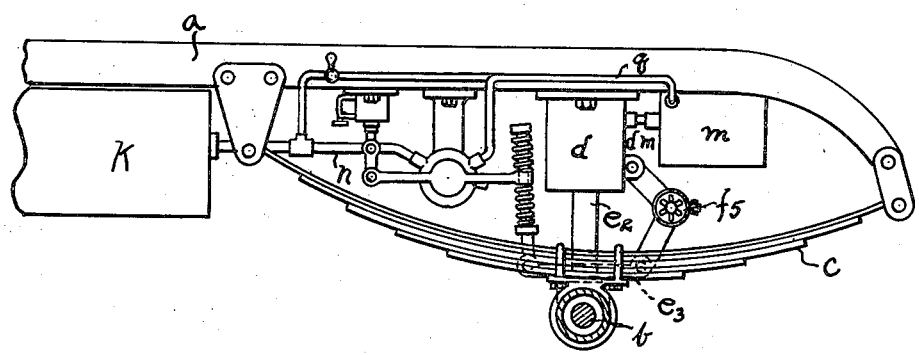
Figure 1, is a side elevation, partly cut away of a portion of an automobile with apparatus embodying my invention attached thereto.
Figure 2:
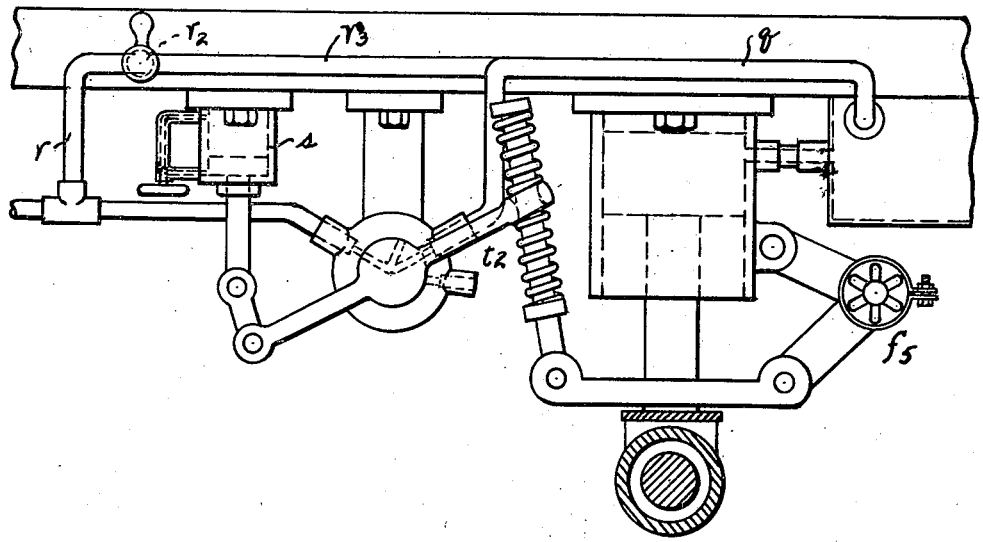
Figure 2, is a side view of a portion of the same to an enlarged scale and showing the parts in a different position.

By this arrangement, the springs $h$ and $h^2$ permit the normal relative movement of the axle and chassis or frame without turning the plug $v$. If however, a large load is placed on the frame $a$ and remains there a sufficient time, it will carry the frame downward which will carry with it the hanger $j$ and the cock $nq$, thus, the spring $h^2$ will press upon the arm $t^2$ steadily and the dash-pot $s$ will permit the movement of the arm $t^2$ and the plug $v$ to the position indicated in Figure 2 in which position the pipes $n$ and $q$ will be put into communication through the passages $n^2$ and $q^2$ (Fig. 4), and air under pressure will be allowed to flow from the high pressure tank $k$ into the tank $m$ and the cylinder $d$ above the piston $e$ to restore the frame to its initial position.

$r$, is a pipe leading from the pipe $n$ and $r^3$ is a pipe leading to the pipe $q$. $r^2$, is a cock interposed between the pipes $r$ and $r^3$. The cock $r^2$ may be turned by hand to get the desired pressure of air into the cylinder $d$ and reservoir $m$.

The tank $m$ is in open and free communication with the cylinder $d$ above the piston $e$ so that the pressure may vary but little in said cylinder because of the relative movement of the frame and axle.

The passage $dm$ is somewhat below the upper part of the cylinder $d$ so that there shall be air in the upper part of said cylinder to prevent the movement of the piston $e$ upwardly beyond said passage.

When the load is removed, the frame rises carrying with it the three-way cock $nq$, and the spring $h$ depresses the arm $t^2$ turning the plug $v$ to a position to put the passages $q^2$ and $ar$ into communication with each other and some of the air is allowed to escape from the cylinder $d$ and reservoir $m$ until the frame $a$ returns to its normal position.

It will be seen that by the above described device, if the load is constant a proportional resilient support may be secured and this support may be of a nature that varies very little with the relative position of the frame and axle so that substantially no vibration will be conveyed from the axle to the frame.

If the load varies as in passenger vehicles, the resilient support will be automatically adjusted to the load and still there will or may be but very little variation in the spring tension.

By omitting the cock $nq$, only the automatic feature will be dispensed with.

Instead of a dash-pot apparatus, the known equivalent,—an inertia apparatus— may be used, as illustrated in Figure 6 in which the fly-wheel $sa$ is substituted for the dash-pot, its crank $s^{3a}$ being connected by the link $st$ to the rod $t$.

That is to say:

The spring $c$ may be made long and flexible so that its tension may vary but little.

What I claim is:—

1. In a vehicle, the combination of an axle, a frame adapted to receive different loads, a resilient support between said frame and axle consisting of two components, and means for automatically adjusting the tension of one component of said resilient support so that the initial tension of said support shall be equal to the weight supported thereon when the axle and frame are spaced the normal distance from each other.

2. In a vehicle, the combination of an axle, a frame adapted to receive different loads, a resilient support between said frame and axle consisting of two components, and means for automatically adjusting the tension of one component of said resilient support so that the initial tension of said support shall be equal to the weight supported thereon when the axle and frame are spaced the normal distance from each other, said adjusting means consisting in part of a dash-pot arrangement and a resilient operating connection between the axle and said adjusting means, substantially as and for the purpose described.

3. In a vehicle, the combination of an axle, a frame adapted to receive different loads, a resilient support between said frame and axle consisting of two components, and means for automatically adjusting the tension of one component of said resilient support so that the initial tension of said support shall be equal to the weight supported thereon when the axle and frame are spaced the normal distance from each other, said adjusting means consisting in part of an element adapted to be operatively moved by the permanent alteration in the relative distance between the axle and the frame but which will not be operatively moved by the temporary alteration of said distance, and a resilient operating connection between the axle and said adjusting means, substantially as and for the purpose described.

4. In a vehicle, the combination of an axle, a frame adapted to receive different loads, a resilient support between said frame and axle, means for adjusting the initial tension of said support to the load upon the frame to maintain a normally constant relative position of the frame and axle, said resilient support being so constructed that its tension shall vary with the variation in the relative vertical positions of the load and axle sufficiently to restore said normal relative position but so little that no shock shall be communicated to the frame due to the momentary variation of the relative position of the frame and axle from the unevenness of the road.

In testimony whereof, I sign this specification.

JOSEPH W. MYERS.